(12) United States Patent
Rousseau et al.

(10) Patent No.: US 10,012,295 B2
(45) Date of Patent: Jul. 3, 2018

(54) LINEAR ACTUATOR FOR MOTION SIMULATOR

(71) Applicant: D-BOX TECHNOLOGIES INC, Longueuil (CA)

(72) Inventors: Robert Rousseau, Longueuil (CA); Steve Boulais, Longueuil (CA); Pierre Senecal, Longueuil (CA); Jean-Francois Menard, Longueuil (CA); Christian Roy, Longueuil (CA)

(73) Assignee: D-BOX TECHNOLOGIES INC., Québec (CA)

( * ) Notice: Subject to any disclaimer, the term of this patent is extended or adjusted under 35 U.S.C. 154(b) by 105 days.

(21) Appl. No.: 14/648,143

(22) PCT Filed: Dec. 2, 2013

(86) PCT No.: PCT/US2013/072612
§ 371 (c)(1),
(2) Date: May 28, 2015

(87) PCT Pub. No.: WO2014/085807
PCT Pub. Date: Jun. 5, 2014

(65) Prior Publication Data
US 2015/0323049 A1    Nov. 12, 2015

Related U.S. Application Data

(60) Provisional application No. 61/731,583, filed on Nov. 30, 2012, provisional application No. 61/787,428, filed on Mar. 15, 2013.

(51) Int. Cl.
*F16H 3/06* (2006.01)
*F16H 25/20* (2006.01)
*F16C 11/04* (2006.01)

(52) U.S. Cl.
CPC .............. *F16H 25/20* (2013.01); *F16C 11/04* (2013.01); *F16H 2025/204* (2013.01);
(Continued)

(58) Field of Classification Search
CPC ................... F16H 25/20; F16H 57/023; F16H 2025/2031; F16H 2025/2075; F16H 2057/0235; F16D 3/68; H02K 7/06
See application file for complete search history.

(56) References Cited

U.S. PATENT DOCUMENTS 2,247,562 A    5/1940    Santen
4,307,799 A    12/1981   Zouzoulas
(Continued)

FOREIGN PATENT DOCUMENTS

CN    102281930 A    12/2011
DE    3743159 A1     6/1989
(Continued)

OTHER PUBLICATIONS

International Search Report for corresponding application PCT/US2013/072312 filed Dec. 2, 2013; dated Apr. 18, 2014.
(Continued)

*Primary Examiner* — Zakaria Elahmadi
(74) *Attorney, Agent, or Firm* — Cantor Colburn LLP

(57) ABSTRACT

A linear actuator comprises a motor having an output. An end block is connected to a casing and to the motor and has a counterbore at a distal end with a bearing seated and retained in the counterbore. A coupling assembly couples the output shaft of the motor to a threaded shaft for transmission of the rotational output to the threaded shaft. A sliding tube is in sliding arrangement with the inner cavity of the casing for moving in translation relative to the casing.

46 Claims, 9 Drawing Sheets

(52) U.S. Cl.
CPC ................ *F16H 2025/2031* (2013.01); *F16H 2025/2075* (2013.01); *Y10T 74/18576* (2015.01); *Y10T 74/18688* (2015.01); *Y10T 403/32606* (2015.01)

(56) References Cited

U.S. PATENT DOCUMENTS

| | | | |
|---|---|---|---|
| 5,053,685 | A | 10/1991 | Bacci |
| 5,505,661 | A | 4/1996 | Habicht |
| 5,511,439 | A * | 4/1996 | Las Navas Garcia .. F16H 25/20 254/98 |
| 6,540,426 | B2 | 4/2003 | Cloyd |
| 6,585,515 | B1 | 7/2003 | Roy |
| 7,033,177 | B2 | 4/2006 | Kim |
| 7,141,752 | B2 * | 11/2006 | Hochhalter ............. F16H 25/20 219/86.25 |
| 7,793,561 | B2 | 9/2010 | Greilinger |
| 7,934,773 | B2 | 5/2011 | Boulais |
| 2002/0109427 | A1 | 8/2002 | Hochhalter |
| 2005/0046291 | A1 | 3/2005 | Suzuki |
| 2006/0081078 | A1 * | 4/2006 | Nagai ................. F16H 25/2015 74/89.23 |
| 2006/0144179 | A1 | 7/2006 | Greilinger |
| 2009/0050451 | A1 | 2/2009 | Sorensen |
| 2012/0168593 | A1 | 7/2012 | Mekid |
| 2012/0227522 | A1 | 9/2012 | Wu |
| 2012/0297908 | A1 * | 11/2012 | Bourgoine ............. F16H 25/20 74/89.23 |
| 2013/0283947 | A1 * | 10/2013 | Yamada ............. F16H 25/2021 74/89.23 |
| 2013/0285494 | A1 * | 10/2013 | Iversen ................... F16H 25/20 310/83 |
| 2014/0013878 | A1 * | 1/2014 | Kollreider ................ A47B 9/04 74/89.35 |
| 2015/0155757 | A1 * | 6/2015 | Hidaka .................. H02K 7/102 310/77 |
| 2015/0222168 | A1 * | 8/2015 | Sakai ................... H02K 49/106 310/93 |

FOREIGN PATENT DOCUMENTS

| | | |
|---|---|---|
| DE | 102008025072 A1 | 12/2009 |
| EP | 1057569 A1 | 12/2000 |
| GB | 2459297 A | 10/2009 |
| WO | 2012077213 A1 | 6/2012 |

OTHER PUBLICATIONS

International Search Report for corresponding application PCT/US2013/072605 filed Dec. 2, 2013; dated Apr. 28, 2014.
International Search Report for corresponding application PCT/US2013/072609 filed Dec. 2, 2013; dated Apr. 28, 2014.
Written Opinion for corresponding application PCT/US2013/072312 filed Dec. 2, 2013; dated Apr. 18, 2014.
Written Opinion for corresponding application PCT/US20131072605 filed Dec. 2, 2013; dated Apr. 28, 2014.
Written Opinion for corresponding application PCT/US2013/072609 filed Dec. 2, 2013; dated Apr. 28, 2014.
International Preliminary Report on Patentability for corresponding application PCT/US2013/072605 filed Dec. 2, 2013; dated Jun. 11, 2015.
International Preliminary Report on Patentability for corresponding application PCT/US2013/072609 filed Dec. 2, 2013; dated Jun. 11, 2015.
International Preliminary Report on Patentability for corresponding application PCT/US2013/072612 filed Dec. 2, 2013; dated Jun. 11, 2015.

* cited by examiner

LINEAR ACTUATOR FOR MOTION SIMULATOR

CROSS-REFERENCE TO RELATED APPLICATION

The present application claims priority on U.S. Provisional Application Ser. No. 61/731,583, filed on Nov. 30, 2012, and on U.S. Provisional Application Ser. No. 61/787,428, filed on Mar. 15, 2013.

FIELD OF THE APPLICATION

The present application relates to linear actuators as used with motion simulators or in motion simulation, for instance to displace an occupant or occupants of a platform in synchrony with a sequence of video images.

BACKGROUND OF THE ART

In the video and televised entertainment industry, there is an increasing demand for enhancing the viewing experience of a viewer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience.

Electro-mechanical linear actuators are commonly used in such motion platforms. These linear actuators must often be capable of producing low and medium amplitude outputs, at low or medium frequency, for a high number of strokes with high precision. Moreover, these linear actuators must support a portion of the weight of a platform and its occupant(s). In some applications such as actuated seats, the linear actuators are limited in vertical dimension, as the space between a seat and the ground is within standards. As a result, these linear actuators are often bulky, prone to failure and have a limited stroke.

It would be desirable to increase the performance of such linear actuators, for instance by maximizing the load capacity per watt and increasing the stroke, while taking into consideration durability.

SUMMARY OF THE APPLICATION

It is therefore an aim of the present disclosure to provide a linear actuator that addresses issues associated with the prior art.

Therefore, in accordance with a first embodiment of the present application, there is provided a linear actuator comprising: a motor having an output shaft for producing a bi-directional rotational output; a casing having an inner cavity defining a joint surface; a threaded shaft within the inner cavity of the casing; an end block connected to a proximal portion of the casing and to the motor, the end block having a tubular portion defining a counterbore adjacent to a distal end thereof; at least one bearing within the inner cavity and seated and retained in the counterbore of the end block; a coupling assembly for coupling the output shaft of the motor to the threaded shaft, the coupling assembly having at least a first coupling component receiving the rotational output from the motor, and at least a second coupling component coupled to the first coupling component for transmission of the rotational output to the threaded shaft; a sliding tube in sliding arrangement with the inner cavity of the casing for moving in translation relative to the casing; a traveling nut in the sliding tube for moving therewith, the traveling nut being operatively engaged to the threaded shaft for converting a rotational motion of the threaded shaft into a translation of the sliding tube; and an integral assembly unit comprising the motor, the threaded shaft, the end block, the at least one bearing, the traveling nut and the sliding tube interconnected to one another so as to be separable by pulling out the integral assembly as a whole from the inner cavity of the casing via the proximal end.

Further in accordance with the first embodiment, the second coupling component comprises a tubular shaft support received in an inner race of the bearing, the tubular receiving therein a proximal end of the threaded shaft.

Still further in accordance with the first embodiment, the tubular shaft support has a distal flange and proximal threading, the linear actuator further comprising a nut threadingly engaged to the proximal threading to retain the tubular shaft support onto the bearing.

Still further in accordance with the first embodiment, the tubular shaft support has a pair of fingers projecting proximally for being coupled to the first coupling component.

Still further in accordance with the first embodiment, the first coupling component comprises a pair of fingers being coupled to the pair of fingers of the tubular shaft support.

Still further in accordance with the first embodiment, a cross-shaped interface is between the pair of fingers of the first coupling component and of the second coupling component.

Still further in accordance with the first embodiment, the cross-shaped interface has a hardness lower than that of the fingers of the first coupling component and of the second coupling component.

Still further in accordance with the first embodiment, the tubular portion of the end block is in contact against a surface of the inner cavity of the casing in an axial section including the bearing.

Still further in accordance with the first embodiment, a ring is fastened to a distal end of the tubular portion of the end block, whereby the bearing is retained between the counterbore and the ring in the integral assembly unit.

Still further in accordance with the first embodiment, the end block has a flange connected to an exterior of the proximal end of the casing and to the motor, the tubular portion projecting distally from the flange.

Still further in accordance with the first embodiment, the end block is a monolithic component.

Still further in accordance with the first embodiment, the casing is machined solely by removal of material from a monolithic substantially cylindrical tube.

Still further in accordance with the first embodiment, a receptacle is machined in a cylindrical surface of the casing, at least one guide received in the receptacle and projecting inwardly from the joint surface, and at least one guide channel in the sliding tube, the at least one guide being received in the at least one guide channel to prevent rotation of the sliding tube relative to the joint surface.

Still further in accordance with the first embodiment, the at least one guide channel is sized so as to delimit a stroke of the sliding tube relative to the casing by contact with the at least one guide.

Still further in accordance with the first embodiment, the guide has a support in the receptacle, and a rolling element rollingly connected to the support and received in the guide channel.

Still further in accordance with the first embodiment, at least one low-friction sleeve is against the joint surface in the inner cavity, the sliding tube sliding against the at least one low-friction sleeve when moving in translation.

Still further in accordance with the first embodiment, the sliding tube is a monolithic closed end tube.

Still further in accordance with the first embodiment, an end interface is exterior to the casing and releasably connected to a distal end of the sliding tube.

Still further in accordance with the first embodiment, the end interface comprises a distally-oriented rounded surface part of a spherical joint.

Still further in accordance with the first embodiment, a vent hole is in the casing and in fluid communication with the inner cavity.

Still further in accordance with the first embodiment, a meshed plug is in the vent hole.

Still further in accordance with the first embodiment, a connection flange is secured to a distal end of the casing, the connection flange adapted to be connected to a seat structure.

Still further in accordance with the first embodiment, the distal end of the casing comprises an integral connection ring with circumferential concavities, and the connection flange comprises a receptacle of negative shape for mating engagement.

In accordance with a second embodiment, there is provided an interface for a linear actuator used between a motion simulator and a ground/base, the interface comprising: a support wall adapted to be secured to the ground/base and having a first surface and a second surface and an opening therethrough; a spherical joint having a first joint component adapted to be connected to an output end of the linear actuator, and a second joint component slidingly received on the first surface, the spherical joint having corresponding spherical joint surfaces on the first joint component and the second joint component for spherical joint movement therebetween; and a connector unit connected to the spherical joint through the opening in the support wall and having a sliding component against the second surface of the support wall to form a sliding joint concurrently with the second joint component and the support wall for movement along at least one degree of translation.

Still further in accordance with the second embodiment, the support wall is part of a bracket, the support wall being generally horizontal, with a pair of walls of the bracket raising the support wall from the ground.

Still further in accordance with the first embodiment, the first joint component has a convex spherical joint surface, and the second joint component has the concave spherical joint surface.

Still further in accordance with the first embodiment, the connector unit comprises a shaft having a first end connected to the sliding component, and a second end adapted to be connected to the linear actuator, a body of the shaft passing through the spherical joint.

Still further in accordance with the first embodiment, the sliding component is a washer-shaped plate.

DESCRIPTION OF THE PREFERRED EMBODIMENTS

Figure 1:
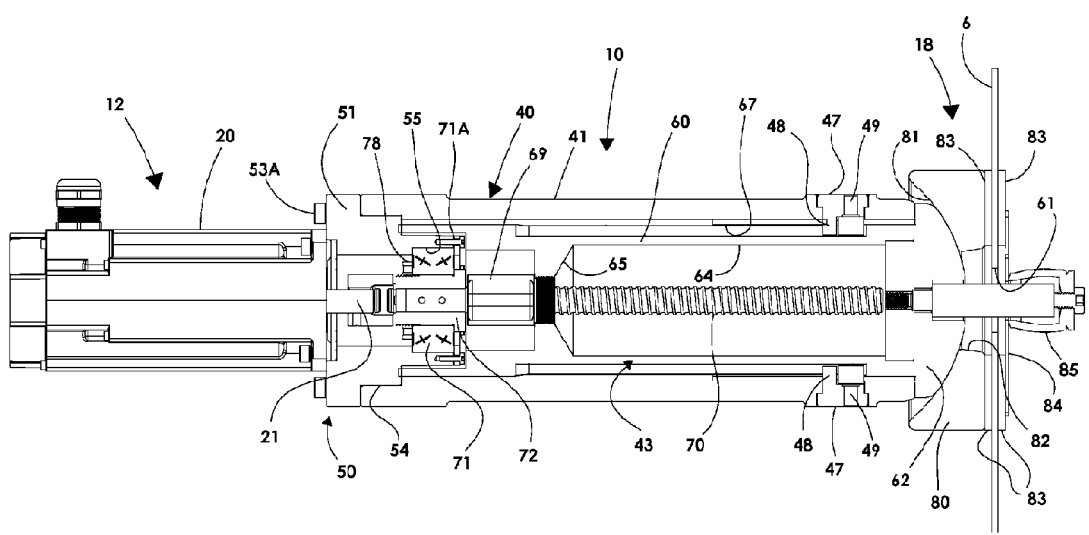
FIG. 1 is a sectional view of a linear actuator for motion simulators in accordance with a first embodiment of the present disclosure.
Figure 2:
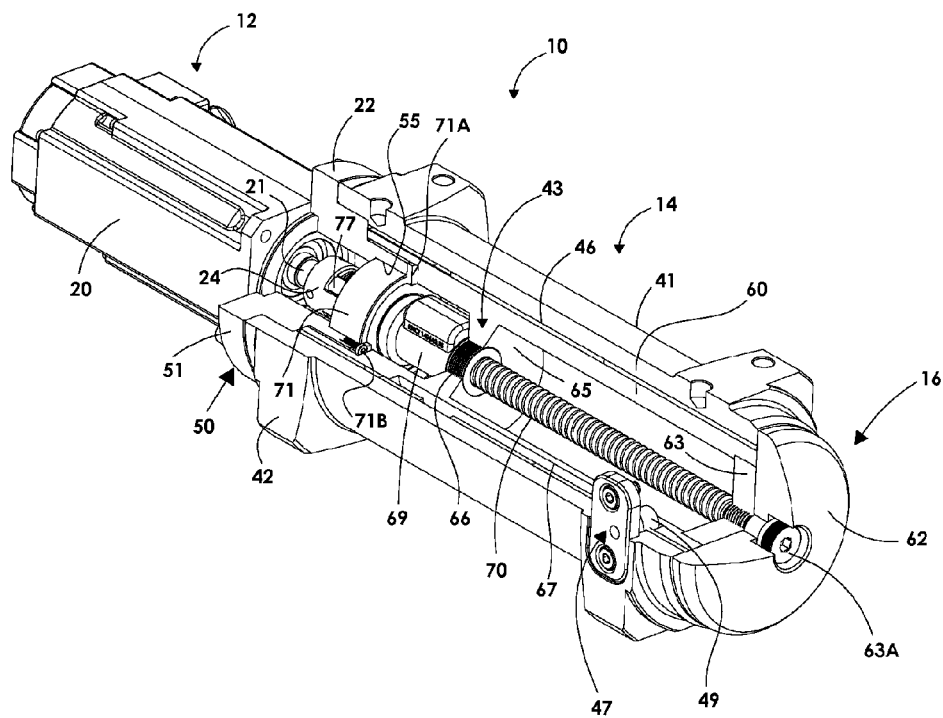
FIG. 2 is a partly sectioned perspective view of the linear actuator of FIG. 1, in a retracted condition.

Referring to the drawings and more particularly to FIGS. 1 and 2, there is illustrated at 10 a linear actuator of the type used for motion simulators. The linear actuator 10 is well suited to be used between the ground and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, etc. The linear actuator 10 of the illustrated embodiments is an electro-mechanical linear actuator that is driven by a motion controller, or any other appropriate and adapted source of motion signals (e.g., media player, D-cinema projector, internet, etc), i.e., code representing specific motions to be performed. The motion signal is sent to the liner actuator 10 in a suitable format to drive a motor thereof. In an embodiment, at least two of the actuator 10 are used concurrently to support and displace a seat relative to the ground. The linear actuator 10 therefore produces a translational output, along an axial direction thereof. When reference is made hereinafter to the axial direction, it will refer to the longitudinal axis of the linear actuator 10, unless stated otherwise.

The linear actuator 10 is an assembly of four groups (i.e., four portions, four sub-assemblies, etc), namely a motor group 12, a structural group 14, a driven group 16, and a bottom interface group 18.

The motor group 12 receives motion signals in electric format, and produces rotational motions corresponding to the motion signals received. The motor group 12 is therefore connected to a source of motion signals.

The structural group 14 houses the driven group 16, and operatively connects the motor group 12 to the driven group 16. Moreover, the structural group 14 may be the interface between the linear actuator 10 and the motion platform, as in the illustrated embodiment.

The driven group 16 converts the rotational motions from the motor group 12 into linear motions, and is the output of the linear actuator 10. The driven group 16 may be the interface between the linear actuator 10 and the ground or a base, as in the illustrated embodiment.

The bottom interface group 18 connects the driven group 16 to the ground or to a base, and is hence at a bottom of the linear actuator 10.

Motor Group 12

Referring to FIGS. 1 and 2, components of the motor group 12 are shown in greater detail. For simplicity purposes, components of the motor group 12 are numbered between 20 and 25.

The motor group 12 has an electric motor 20. The electric motor 20 is a bi-directional motor of the type receiving an electrical motion signal, to convert the signal in a rotational output proportional to the motion signal, in either circular directions, in direct drive. Accordingly, the electric motor 20 has an output shaft 21. By way of example, the electric motor 20 is a Danaher motor, such as models 22C or 32D, among other possible options. This type of electric motor is provided as an example, and any other appropriate type of motor may be used.

A body of the motor 20 has a connection flange 22 adjacent to the output shaft 21. The connection flange 22 defines throughbores 23 (e.g., tapped throughbores), by which fasteners such as bolts (not shown), washers, and the like may be used to connect the motor 20 to the structural group 14. Any appropriate type of connection means may be used as alternatives to the flange 22 and fasteners.

In the illustrated embodiment, a coupling component, such as a motor coupler 24, is connected to the output shaft so as to be integral therewith (e.g., by way of a set screw, etc). Hence, the motor coupler 24 rotates with the output shaft 21. The motor coupler 24 will be coupled to the driven group 16 as described hereinafter, or may alternatively be part of the driven group 16. For being coupled, the coupler 24 has a pair of fingers 25 projecting in the axial direction. The fingers 25 are one contemplated configuration for coupling the coupler 24 to the driven group 16.

Structural Group 14

Referring to FIGS. 1 to 5, components of the structural group 14 are shown in greater detail. For simplicity purposes, components of the structural group 14 are numbered between 40 and 55.

The structural group 14 comprises a casing 40, also known as a cover, housing, or the like. In the illustrated embodiment, the casing 40 has a tubular portion 41 with tapped connection bores 41A (FIG. 5) on a proximal end rim of the tubular portion 41. The casing 40 may further comprise a pair of flanges 42 at opposite ends. In an embodiment, the tubular portion 41 and the flanges 42 of the casing 40 are machined into a monolithic piece. The casing 40 is a main structural component of the linear actuator 10, as it interfaces the motor group 12 to the driven group 16, and may also interface the linear actuator 10 to a motion platform. As the casing 40 may be the interface of the linear actuator 10 with the motion platform, other connection means may be provided on the surface of the casing 40, such as tapped bores 42A provided on flat surfaces of the flanges 42.

Referring to FIGS. 1-4, the casing 40 defines an inner cavity 43 that houses a part of the driven group 16. The inner cavity 43 has a main section delimited by a joint surface 44, and an open distal end 44A of the casing 40. The joint surface 44 is the surface against which a moving component of the driven group 16 will slide.

A counterbore section located at the proximal end of the inner cavity 43 and is delimited by a seat surface 45 and the open proximal end of the casing. The counterbore section is separated from the joint surface 44 by a seat shoulder 45A.

It is observed that the joint section and the counterbore section may be machined from tooling inserted at a single end, namely the proximal end. Moreover, the sections may be concentric with one another.

Referring to FIGS. 1-5, a sleeve 46 (or sleeves 46) may be fitted onto the joint surface 44 to act as an interface for a sliding component of the driven group 16, as described hereinafter. In an embodiment, there are at least two sleeves sections making up the sleeve 46, as a matter of available sleeve sizes. The sleeve 46 is hence made of a material having a relatively high hardness for a relatively low coefficient of friction, such as Igus® Iglide® material (e.g., A-500). Stopper guides 47 project through the joint surface 44 and into the inner cavity 43. The end of the stopper guide 47 are within the inner cavity 43 of the casing 40, and will serve as guides for a sliding component of the driven group 16, to ensure linear motion, i.e., anti-rotation guides for the sliding component of the driven group 16. Moreover, the guides 47 may act as stoppers to delimit the stroke of the linear actuator 10. In the illustrated embodiment, the guides 47 each have a stopper abutment 48 having an arcuate abutment surface, and a rolling guide 49. The stopper abutment 48 and the rolling guide 49 may be mounted on a common plate, and insertable in appropriate openings in the casing 40, such as through the flanges 42. In the illustrated embodiment, the stopper guides 47 are on diametrically opposed on the casing 40, and are readily removable by undoing fasteners 49A.

Referring to FIGS. 1 to 5, an end block 50 is connected to the proximal open end of the casing 40. The end block 50 is in the interface between the motor 20 and the casing 40, and is therefore exposed to high forces relative to other components of the linear actuator 10. The end block 50 has a tubular body with an end flange 51. The end flange 51 has circumferentially distributed throughbores 52 by which it is fixed to the casing 40, with the throughbores 52 being aligned with the tapped connection bores 41A of the tubular portion 41. Hence, fasteners such as bolts 52A may be used. Likewise, the end flange 51 has another set of circumferentially distributed throughbores 53 by which the motor 20 may be fixed to it, with the throughbores 53 being aligned with the throughbores 23 in the connection flange 22 of the motor 20. Fasteners such as bolts 53A may be used to connect the motor 20 to the end block 50. A collar 54 is between the end flange 51 and the distal end of the end block 50. The collar 54 is sized so as to be received in the counterbore section of the casing 40, and is in contact with the seat surface 45 and the seat shoulder 45A. Therefore, by the mating engagement between the counterbore section and the collar 54, the end block 50 is solidly anchored to the casing 40.

Figure 3:
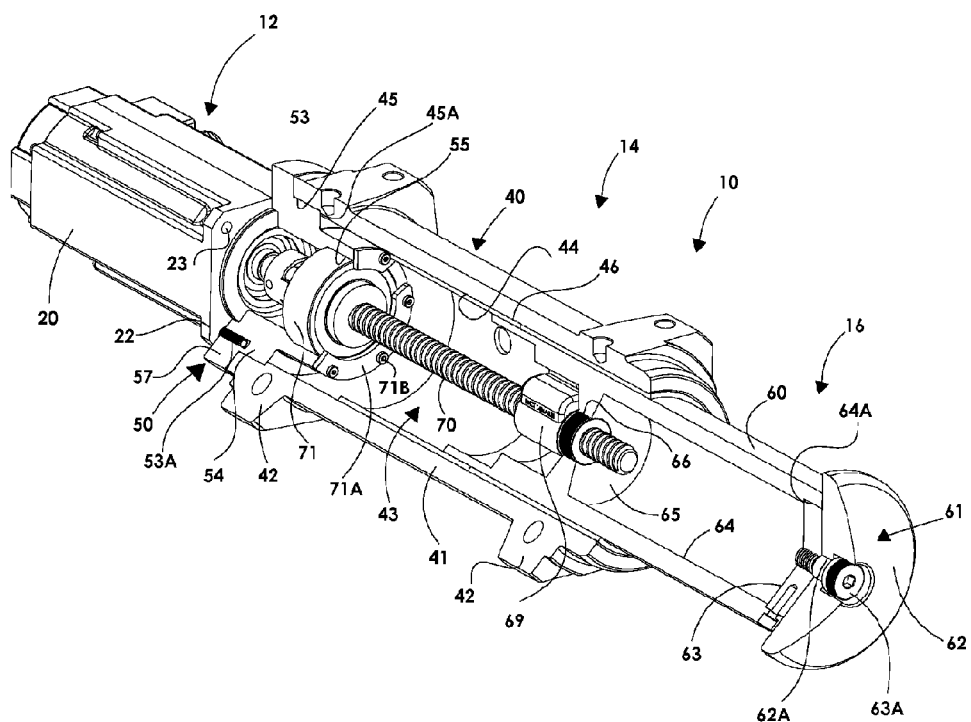
FIG. 3 is a partly sectioned perspective view of the linear actuator of FIG. 1, in an extended condition.

Referring to FIGS. 2 and 3, it is shown that the distal end of the end block 50 has a smaller diameter than that of the joint surface 44 of the inner cavity 43. An annular gap is therefore formed between the joint surface 44 of the inner cavity 43 and the distal end of the end block 50.

The distal end of the end block 50 may define a counterbore 55 in its interior, for forming a seat for a bearing. Moreover, although not visible as hidden by other components, tapped bores may be circumferentially distributed on an end rim of the distal end of the end block 50. The end block 50 may be a monolithic block, machined, molded and/or cast.

Driven Group 16

Referring to FIGS. 1 to 5, components of the driven group 16 are shown in greater detail. For simplicity purposes, components of the driven group 16 are numbered in the 60s and 70s.

The driven group 16 has a sliding tube 60, also known as a piston. The sliding tube 60 is the main moving component of the driven group. The sliding tube 60 is fitted within the inner cavity 43 of the casing 40, and is sized so as to be in sliding contact with the sleeve 46 on the joint surface 44. Hence, the sliding tube 60 may move in the axial direction in the inner cavity 43 of the casing 40, such that a distal end of the sliding tube 60 may project out of the distal end of the casing 40 by a variable distance. For instance, in FIG. 2, the sliding tube 60 is retracted within the casing 40 in a retracted condition of the linear actuator 10, whereas the sliding tube 60 is fully extended out of the casing 40 in FIGS. 3 and 4, in an extended condition of the linear actuator 10.

In the illustrated, an interface 61 is therefore provided at a distal end of the sliding tube 60, outside of the casing 40. The interface 61 may be a ground or base interface if the linear actuator 10 is oriented with the interface 61 downward. For instance, the interface 61 may lie directly on the ground, or be a part of a joint concurrently defined with the bottom interface group 18. The interface 61 is shown in the figures as having a frusto-spherical cap 62, i.e., forming a rounded contact surface. A bore 62A, for instance tapped, is located in the center of the cap 62, such that the cap 62 may be fastened to a support plug 63 by a fastener such as a bolt or shaft 63A. The support plug 63 is received in an inner cavity 64 of the sliding tube 60. In the illustrated embodiment, the inner cavity 64 has a shoulder 64A to provide axial abutment to the support plug 63, which may be also be secured to the sliding tube 60 by lateral screws as shown, or the like. The cap 62 and the support plug 63 are one solution among many others that can be used as the interface 61 at the end of the sliding tube 60. It is also considered to provide the cap 62 and support plug 63 in a monolithic configuration. The material used for the support plug 63 is selected as a function of the sliding engagement of the support plug 63 on the components of the bottom interface group 18, as will be described hereinafter. Alternatively, the rounded surface of the support plug 63 may have surface treatment to be smooth and hence have a lowered friction coefficient.

Figure 4:
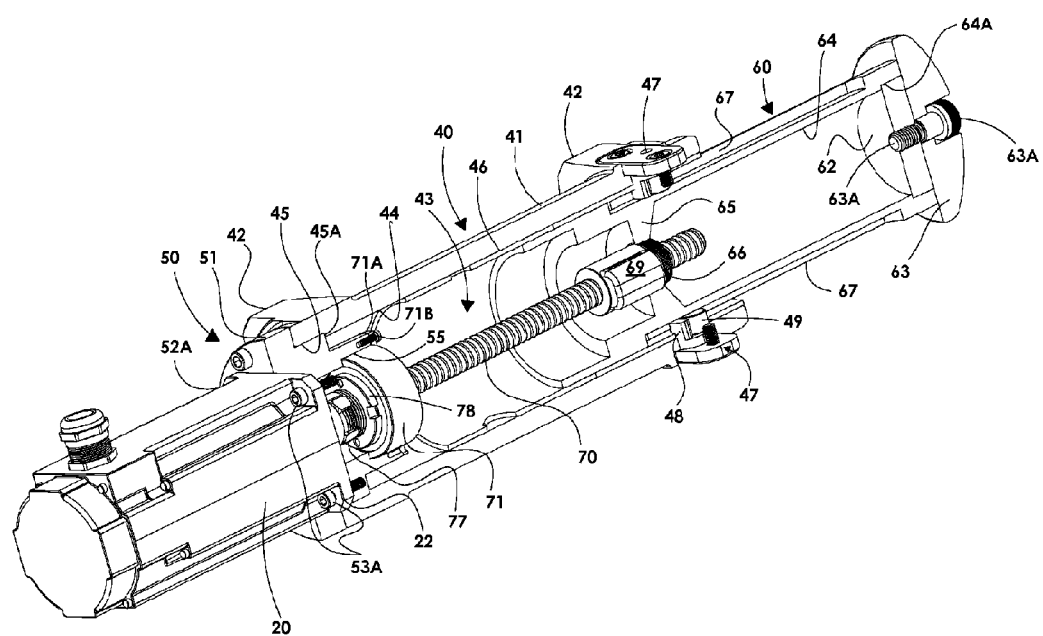
FIG. 4 is a partly sectioned perspective view of the linear actuator of FIG. 1, in an extended condition, showing an interaction between stopper guides and sliding tube.
Figure 5:
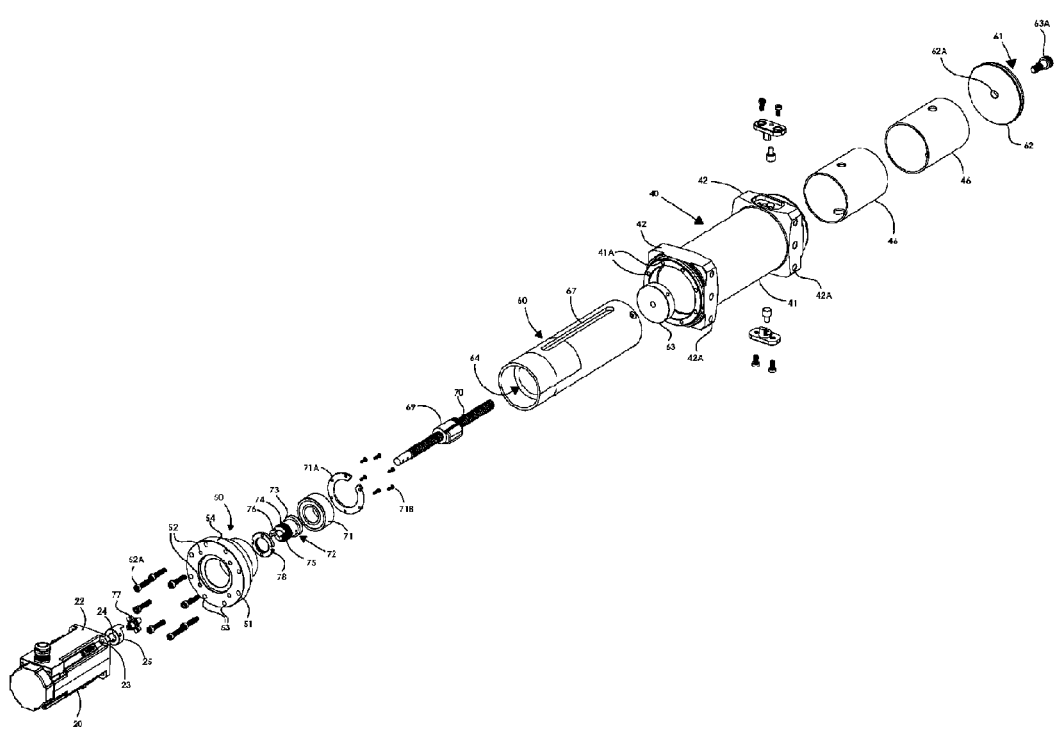
FIG. 5 is an exploded view of the linear actuator of FIG. 1.

Referring to FIGS. 2-4, the inner cavity 64 is shown as extending the full length of the sliding tube 60. An inner wall 65 is located inside the inner cavity 64, and lies in a transverse plane relative to the axial direction. A central bore 66 is centrally located in the inner wall 65. The central bore 66 is shown as being tapped.

On an outer surface of the sliding tube 60, a pair of guide channels 67 are formed. The guide channels 67 are parallel to the axial direction. In operation, ends of the stopper guides 47 will be received in the guide channels 67. In the illustrated embodiment, the sliding tube 60 features a pair of the guide channels 67, with the guide channels 67 being diametrically opposed on the sliding tube 60. However, more or less of the guide channels 67 could be used, with a corresponding number of the stopper guides 47. As shown in FIG. 4, the stopper abutments 48 are oriented to have their arcuate abutment surfaces contact the end of the guide channels 67 when the linear actuator 10 reaches a fully extended condition. The rolling guides 49 are sized to contact one of the side walls of the respective guide channels 67, during a movement of the sliding tube 60 relative to the casing 40. The rolling guides 49 will therefore ensure that the sliding tube 60 is limited to a translational degree of freedom (with little or no rotational play). Moreover, the rolling nature of the rolling guides 49 will minimize frictional losses at the contact between the rolling guides 49 and the guide channels 67. As shown in FIG. 2, the rolling guides 49 may act as stoppers when the sliding tube 60 is fully retracted.

A traveling nut 69 is secured to the sliding tube 60. In the illustrated embodiment, the traveling nut 69 has a threaded end by which it is screwingly connected to the tapped bore of the inner wall 65 of the sliding tube 60, so as to move integrally with the sliding tube 60. A body of the traveling nut 69 is on the proximal side of the inner wall 65 in the illustrated embodiment. The traveling nut 69 may be any appropriate type of mechanism operating with a lead screw (i.e., threaded shaft) to convert a rotation of the lead screw into a translation of the sliding tube 60. For instance, the traveling nut 69 is a ball screw unit. One suitable ball screw unit is a NSK rolled ball screw with a return tube, such as a RNCT type ball nut. However, many other types of traveling nuts 69 are considered as alternatives to rolled ball screws. Moreover, the nut 69 may be a monolithic part of the sliding tube 60.

Referring concurrently to FIGS. 1 to 5, a threaded shaft 70 (i.e., lead screw, bolt) is in operative engagement with the traveling nut 69. The threaded shaft 70 is coupled to the electric motor 20, to transmit the rotational output of the motor 20 to the sliding tube 60. The threaded shaft 70 has a helical raceway that is compatible with the traveling nut 69. As the traveling nut 69 is fixed to the sliding tube 60, and as the sliding tube 60 is limited to translational movements due to the interaction between the stopper guides 47 and the guide channels 67, a rotation of the threaded shaft 70 results in a translation of the traveling nut 69.

The threaded shaft 70 is rotatably connected to the casing 40 by a bearing 71, to rotate about its longitudinal axis (substantially parallel to the axial direction), while being retained from translating. The bearing 71 is accordingly seated in the counterbore 55 of the end block 50. A ring 71A and bolts 71B or like fasteners may be used to securely hold the bearing 71 in the counterbore 55. The bearing 71 may be a ball bearing, a roller bearing, a ball-less bearing, or any appropriate type of bearing.

A shaft support 72 interconnects the shaft 70 to the bearing 71. In the illustrated embodiment, the shaft support 72 is a monolithic piece of metal that is cast, molded and/or machined. The shaft support 72 has an annular body that receives a proximal end of the shaft 70. The shaft support 72 is fixed to the shaft 70, for instance by a set screw or rolled pin radially arranged between the shaft 70 and the shaft support 72, whereby the shaft support 72 rotates with the shaft 70. The shaft support 72 has a distal flange 73 and a proximal head 74. The head 74 has an outer diameter corresponding to the inner diameter of the inner race of the bearing 71, for the bearing 71 to be mounted thereon and to abut the flange 73. The dimensioning of the head 74 is selected so as to reach an appropriate fit with the bearing 71 (e.g., interference fit, force fit), to reduce or remove any play between the bearing 71 and the shaft support 72.

The head 74 has threading 75 at a proximal end, and has a pair of fingers 76 for being coupled to the motor coupler 24. The pair of fingers 76 are a coupling component by which the shaft 70 will be coupled to the fingers 25 of the motor coupler 24 of the motor 20, for transmission of a rotational output from the electric motor 20 to the shaft 70. A joint interface 77 is positioned between the motor coupler 24 and the head 74. The joint interface 77 is cross-shaped, and hence defines four clearances, two of which receive the fingers 25, and two of which receive the protrusions 76. The four clearances of the joint interface 77 are sized so as to minimize or prevent any play with the fingers 35 and the protrusions 76. However, the joint interface 77 is made of a relatively hard material, yet with a hardness lower than that of the metallic material used for the motor coupler 24 and the shaft support 72. For instance, the joint interface 77 is made of a high-density polymeric material of Duro 90 hardness. When the linear actuator 10 is assembled in the manner shown in FIGS. 1 to 5, the joint interface 77 is held captive in the open cavity 75, between the motor coupler 24 and the head 74, but is not secured to either. Hence, the joint interface 77 allows some freedom of alignment between the motor coupler 24 and the head 74, for instance if the output shaft 21 of the motor 20 and the threaded shaft 70 are not perfectly aligned. Hence, the joint interface 77 forms a universal-like joint between the motor coupler 24 and the shaft support 72. The coupling assembly described above is one of numerous configurations considered for coupling the shafts 21 and 70.

A nut 78 or like tapped ring is threadingly engaged to the threading 75 of the outer surface of the head 74. The nut 78 may be tightened against the inner race of the bearing 71, whereby the inner race of the bearing 71 and the head 74 integrally rotate with one another.

As best seen in FIG. 3, the bearing 71 is aligned with the annular gap formed between the distal end of the end block 50 and the joint surface 44 of the casing 40. In the retracted condition of the linear actuator 10, the end of the sliding tube 60 penetrates the annular gap. This arrangement gives moving room to the sliding tube 60 in terms of stroke. Moreover, as shown in FIG. 4, in the fully extended condition of the linear actuator 10, there remains a substantial contact surface of the sliding tube 60 with the joint surface 44 (i.e., or with the sleeves 46 thereon). A minimum length of contact surface in the axial direction between the casing 40 and the sliding tube 60 (i.e., the length of tube 60 that remains in the casing 40 in the extended condition) is about 2 times the diameter of the sliding tube 60.

Bottom Interface Group 18

Figure 6:
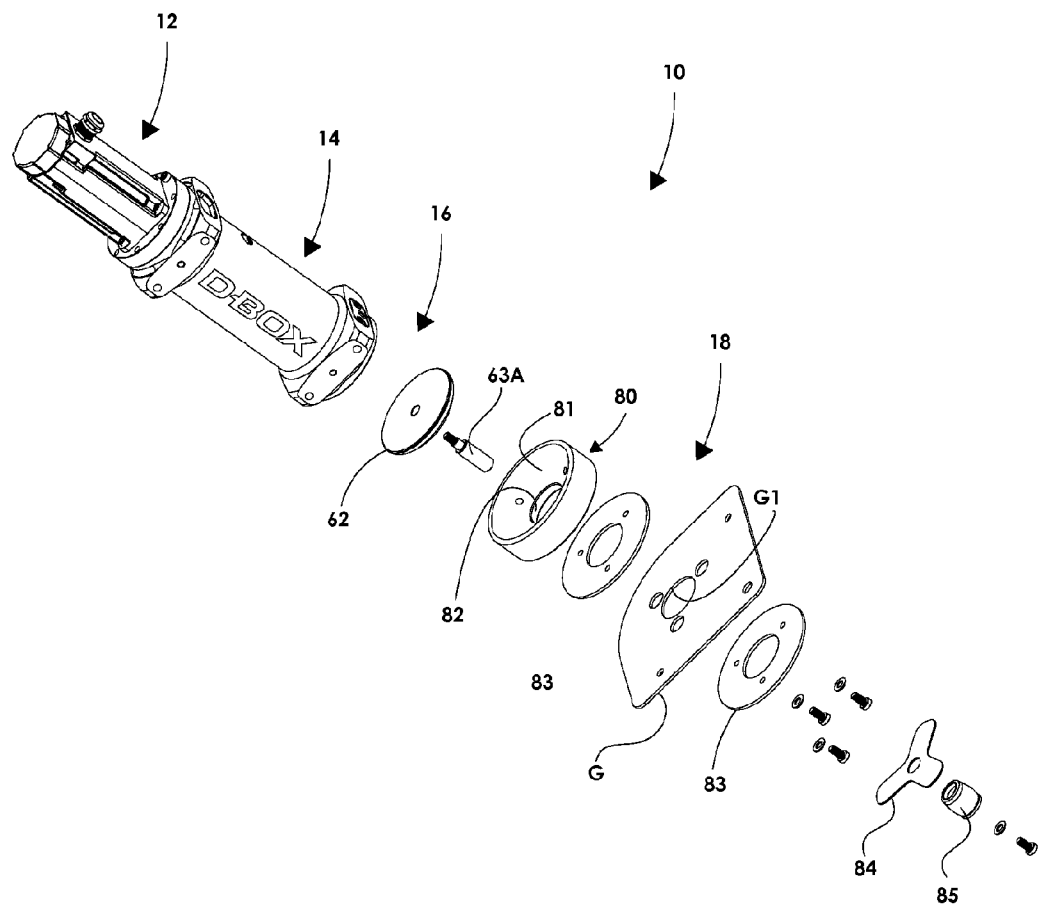
FIG. 6 is an exploded view of a bottom interface group of the linear actuator of FIG. 1, relative to a remainder of the linear actuator.

Referring to FIGS. 1 and 6, components of the bottom interface group 18 are shown in greater detail. For simplicity purposes, components of the bottom interface group 18 are numbered in the 80s.

The bottom interface group 18 forms a joint with the linear actuator 10 to reduce stresses and strains to which the linear actuator 10 is exposed at its interface with the ground or to a base. The bottom interface group 18 therefore allows multiple degrees of freedom between the linear actuator 10 in the ground. In the illustrated embodiment, the bottom interface group 18 may allow up to three rotational degrees of freedom and two translational degrees of freedom.

The bottom interface group 18 is connected to a base plate G, that is for instance part of a frame that connects the linear actuator 10 to the ground or to a base. The base plate G has an opening G1, and opposed planar surfaces.

A receptacle 80 defines an open cavity having a frusto-spherical surface 81, sized to have the same radius as the cap 62. Therefore, the cap 62 will be received in the open cavity, to be in sliding contact with the frusto-spherical surface 81, forming a spherical joint. These two joint components may be reversed, such that the receptacle 80 could have a frusto-spherical convex surface, with the cap 62 providing the concave spherical joint surface. The receptacle 80 may therefore consist of a material that has a low friction coefficient, or that may have a coating or the like on the spherical surface 81 for smooth movement of the cap 62 thereon. A central opening 82 is in a bottom center of the receptacle 80, to allow the shaft 63A to extend to an underside of the base plate G.

Washer plates 83 are on opposite sides of the base plate G, and are one of many configurations possible to form part of a sliding joint. Because of the presence of various throughbores in the base plate G, the washer plates 83 may move relative to the base plate G. A clamping piece 84 is mounted onto the shaft 63A, and pressed against one of the washer plates 83 by tightening the cap 85. As a result, the base plate G and the washer plates 83 are sandwiched between a bottom surface of the receptacle 80 and the clamping piece 84. The assembly forms a translational degree of freedom joint between the bottom end of the linear actuator 10 (i.e., via the cap 62) and the base plate G. The sliding joint formed may have one or two translational degrees of freedom.

Now that the various components of the linear actuator 10, an operation thereof is set forth.

The operation will refer to the linear actuator 10 as being oriented such that the interface 61 is facing the ground.

The linear actuator 10 is initially calibrated, in that the position of the sliding tube 60 is known relative to casing 40. This may be done by any appropriate method, including calibration movements when the linear actuator 10 is turned on, as controlled by a platform controller.

The electric motor 20 receives motion signals and will hence produce rotational outputs proportional to the motion signals, in the selected directions. The rotational outputs will be transmitted through the output shaft 21, to the threaded shaft 70 via the coupling therebetween.

The sliding tube 60 and traveling nut 69 will convert rotations of the threaded shaft 70 into a translation of the sliding tube 60 along the axial direction. As the sliding tube 60 is connected to the ground or a base via the bottom interface group 18, the resulting action will be a translational motion of the motor 20 and casing 40 relative to the ground or a base, and possibly other adjustments movements permitted by the joint formed with the bottom interface group 18. As the motion platform is connected to the motor 20 or the casing 40, the motion platform will move with the motor 20 and the casing 40. As mentioned above, it is pointed out that additional degrees of freedom may be present between any of ground/base, the motor 20/casing 40, and the sliding tube 60, for instance by the presence of joints between the motion platform, the ground/base and the linear actuator 10.

In instances, the sliding tube 60 is connected to the motion platform while the motor 20 and the casing 40 are secured to the ground or to a base. In such a case, the motion platform will move with the sliding tube 60.

Figure 7:
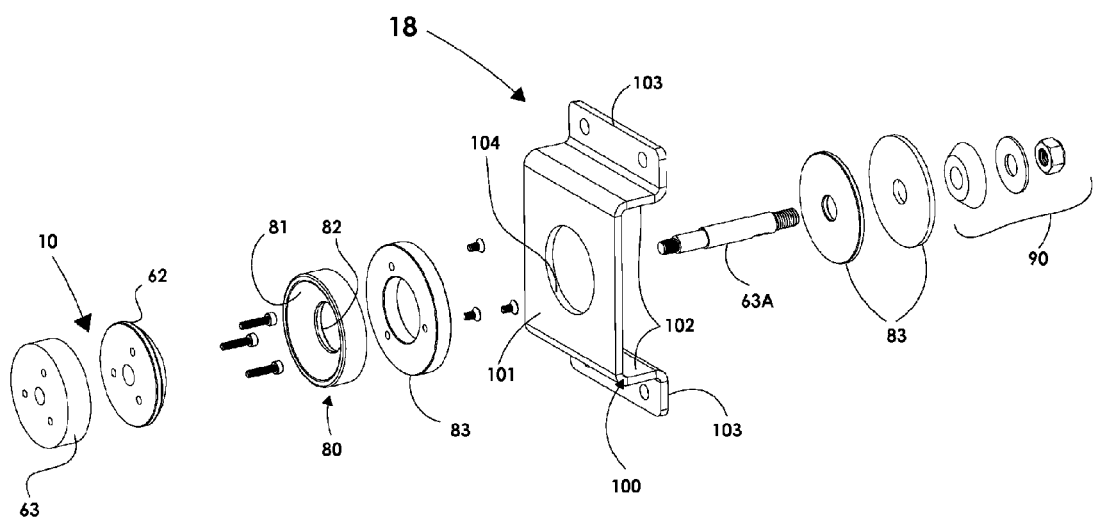
FIG. 7 is an exploded view of a bottom interface group in accordance with the present disclosure.
Figure 8:
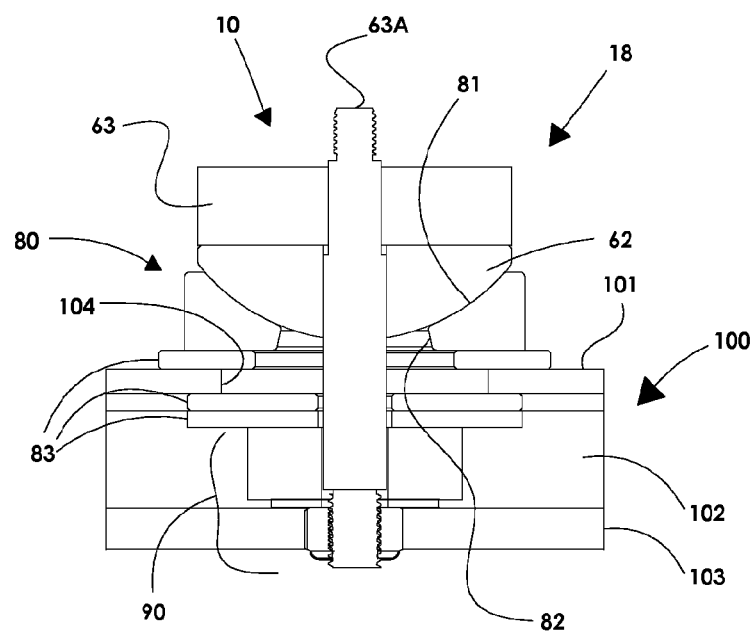
FIG. 8 is a sectional view of the bottom interface group of FIG. 7.

Referring to FIGS. 7 and 8, an alternative embodiment of the bottom interface group is generally shown at 18'. As the bottom interface group 18' of FIGS. 7 and 8 bears many similarities with the bottom interface group 18 of FIGS. 1 to 6, whereby like elements will bear like reference numerals.

The group 18' comprises a variety of washers and nuts 90 as an alternative to that of the group 18, but a similar arrangement to that of the group 18 could be used. A bracket 100 is used instead of base plate G. The bracket 100 has a support wall 101 spaced apart from the ground by vertical walls 102. Flanges 103 are at a bottom of the vertical walls 102, and may be fastened to the ground in any appropriate manner, such as with bolts, screws, etc. An opening 104 is defined in the support wall 101, for the shaft 63A to pass therethrough. Hence, the assembly forms a two translational degree of freedom joint between the bottom end of the linear actuator 10 (i.e., via the cap 62) and the support wall 101. With the bracket 100, the joint is formed above the ground, whereby the linear actuator 10 may be installed without requiring a cavity in the ground.

Figure 9:
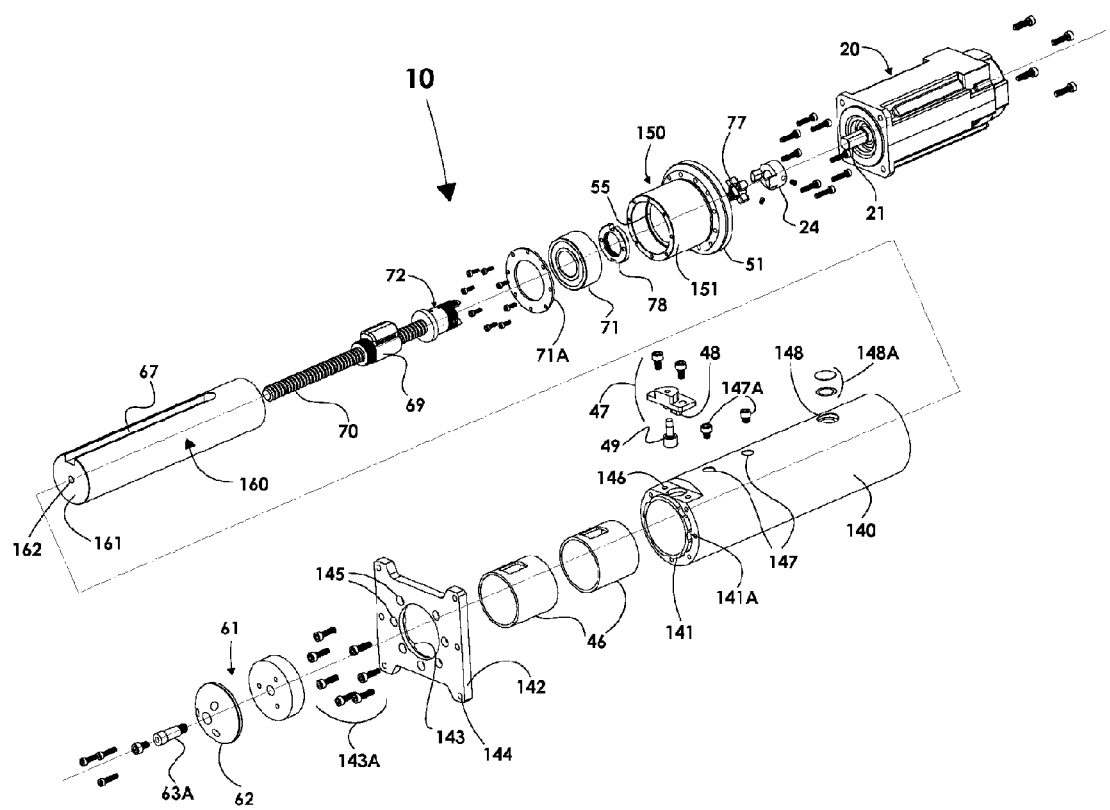
FIG. 9 is an exploded view of a linear actuator for motion simulators in accordance with a second embodiment of the present disclosure.

Referring to FIG. 9, an alternative embodiment of the linear actuator is generally shown at 10'. As the linear actuator 10' of FIG. 9 bears many similarities with the linear actuator of FIGS. 1 to 6, like elements will bear like reference numerals in FIG. 9.

The linear actuator 10' has a casing 140 that differs from the casing 40 (FIG. 1) in that it has a generally tubular cylindrical body with various details machined into the tubular cylindrical body. Hence, as a start point, the casing 140 has a substantially tubular cylindrical body of relatively standard format, and the machining required to achieve the finished configuration of the casing 140 as in FIG. 9 is substantially reduced compared to that of the casing 40, as is the amount of metal removed.

The machining includes defining a connection ring 141 at the distal end of the casing 140. The connection ring 141 has a generally annular shape, with circumferential concavities 141A. Hence, flange 142, discrete from the casing 140, may be attached to the casing 140 by mating engagement with the connection ring 141, as the flange 142 has a receptacle 143 of negative shape relative to the connection ring 141. The concavities 141A allow fasteners 143A to be closer to the center of the linear actuator 10', the fasteners 143 securing the flange 142 to the casing 140. Furthermore, the concavities 141A of the connection ring 141 serve as a supplemental anti-rotation feature preventing rotation of the flange 142 about a longitudinal axis of the linear actuator 10'. The flange 142 is used to interface the linear actuator 10' to a structure (e.g., seat structure), and is thus provided with connection holes 144, as one of multiple configurations considered to connect the linear actuators 10/10' to a structure. Circumferentially distributed connection holes 145 are used with the fasteners 143A.

The machining of the casing 140 further includes defining a receptacle 146 for one or more of the stopper guides 47. One of the stopper guides 47 (with its stopper abutment 48 and rolling guide 49) may suffice to limit the stroke of the linear actuator 10', and ensure a translational movement thereof.

The machining of the casing 140 further includes defining holes 147 and 148 in the cylindrical portion of the casing 140. Holes 147 are tapped holes that may be provided in the casing 140 for fasteners 147A to hold the sleeves 46 in position inside the casing 140. Hole 148 is used as a vent, in light of the changes of volume in the casing 140 resulting from the movements of the sliding tube therein. A mesh plug 148A may be used to reduce the risk of infiltration of contaminants within the casing 140.

Still referring to FIG. 9, the linear actuator 10' has an end block 150 that differs from the end block 50 (FIG. 1) in that its tubular body has a single cylindrical outer surface 151, as opposed to the end block 50 that is stepped by way of the collar 54. In other words, the cylindrical outer surface 151 is precisely machined to be contactingly received against a surface of the inner cavity of the casing 140, without any play therebetween. This increased contact area between the end block 150 and the casing 140 compared to the end block 50 and casing 40 increases the structural integrity of this assembly. As the end block 150 supports the bearing 71 in its counterbore 55, this portion of the linear actuator 10' is subjected to important loads, whereby the configuration described above is well suited for the loads involved in this portion. The end block 150 contacts the inner cavity of the casing 140 at the axial section that includes the bearing, i.e., the axial section comprising an axial plane to which the longitudinal axis of the linear actuator 10/10' is normal.

Still referring to FIG. 9, the linear actuator 10' has a sliding tube 160 that differs from the sliding tube 160 (FIG. 1) in that it has a generally tubular cylindrical body with a closed end 161 monolithically part of the sliding tube 160. Hence, the sliding tube 160 has improved structural integrity, notably as the closed end 161 has a tapped bore 162 for connecting same to the interface 61.

The linear actuators 10 and 10' of FIGS. 1-9 show an important maintenance simplification, in that an integral assembly unit is formed, including the motor 20, the end block 50/150, the sliding tube 60/160, the traveling nut 69, the threaded shaft 70, and the bearing 71. The integral assembly unit has these components and associated components interconnected to one another so as to be separable as a whole from the casing 40/140, simply by pulling out the integral assembly as a whole from the casing 40/140 via the proximal end. It may be required to disconnect beforehand the sliding tube 60/160 from components of the bottom interface group 18. Likewise, the stopper guides 47 are removed before this maneuver. Therefore, in the event that one of the linear actuators 10/10' needs repair or maintenance, some structural components of the linear actuators 10/10' (e.g., the casing 40/140) may remain on site for use with a replacement integral assembly unit, while the removed integral assembly unit may be taken away.

The above-described linear actuators 10/10' may be capable of operating with a load capacity between 340 kg and 408 kg, with a frequency of 0-100 Hz of movements. The amplitude of the stroke may be up to 152 mm for the above-referred load capacity. The sliding tube 60 has a diameter of between 74 mm±5 mm and the inner cavity 43 of the casing 40 has a length of about 274 mm±10 mm. Therefore, the linear actuators 10/10' have such a load capacity and stroke for a ratio of casing length to piston diameter ranging between 3.3 and 4.1.

The invention claimed is:

1. A linear actuator comprising:
   a motor having an output shaft for producing a bi-directional rotational output;
   a casing having an inner cavity defining a joint surface;
   a threaded shaft within the inner cavity of the casing;
   an end block connected to a proximal portion of the casing and to the motor, the end block having a tubular portion and defining an abutment seat surface;
   at least one bearing within the inner cavity and seated and retained against the abutment seat surface in the end block;
   a coupling assembly for coupling the output shaft of the motor to the threaded shaft for transmission of the rotational output to the threaded shaft, the coupling assembly having at least a first coupling component receiving the rotational output from the motor, and at least a second coupling component coupled to the first coupling component, and wherein the second coupling component comprises a tubular shaft support received in an inner race of the bearing, the tubular shaft support receiving therein a proximal end of the threaded shaft, the tubular shaft support having a distal flange and proximal threading, the linear actuator further comprising a nut threadingly engaged to the proximal threading to retain the tubular shaft support onto the bearing;
   a sliding tube in sliding arrangement with the inner cavity of the casing for moving in translation relative to the casing;
   a traveling nut connected to the sliding tube for moving therewith, the traveling nut being operatively engaged to the threaded shaft for converting a rotational motion of the threaded shaft into a translation of the sliding tube; and
   an integral assembly unit comprising the motor, the threaded shaft, the end block, the at least one bearing, the traveling nut and the sliding tube interconnected to one another so as to be separable by pulling out the integral assembly as a whole from the inner cavity of the casing via the proximal end.

2. The linear actuator according to claim 1, wherein the tubular shaft support has a pair of fingers projecting proximally for being coupled to the first coupling component.

3. The linear actuator according to claim 2, wherein the first coupling component comprises a pair of fingers being coupled to the pair of fingers of the tubular shaft support.

4. The linear actuator according to claim 3, further comprising a cross-shaped interface between the pair of fingers of the first coupling component and of the second coupling component.

5. The linear actuator according to claim 1, wherein the tubular portion of the end block is in contact against a surface of the inner cavity of the casing in an axial section including the bearing.

6. The linear actuator according to claim 1, wherein the abutment seat surface is defined by a counterbore adjacent to a distal end of the end block, and further comprising a ring fastened to the distal end of the end block, whereby the bearing is retained between the abutment seat surface and the ring in the integral assembly unit.

7. The linear actuator according to claim 1, wherein the end block has a flange connected to an exterior of the proximal end of the casing and to the motor, the tubular portion projecting distally from the flange.

8. The linear actuator according to claim 1, wherein the casing is machined solely by removal of material from a monolithic substantially cylindrical tube.

9. The linear actuator according to claim 8, further comprising a receptacle machined in a cylindrical surface of the casing, at least one guide received in the receptacle and projecting inwardly from the joint surface, and at least one guide channel in the sliding tube, the at least one guide being received in the at least one guide channel to prevent rotation of the sliding tube relative to the joint surface.

10. The linear actuator according to claim 9, wherein the at least one guide channel is sized so as to delimit a stroke of the sliding tube relative to the casing by contact with the at least one guide.

11. The linear actuator according to claim 1, further comprising at least one low-friction sleeve against the joint surface in the inner cavity, the sliding tube sliding against the at least one low-friction sleeve when moving in translation.

12. The linear actuator according to claim 1, wherein the sliding tube is a monolithic closed end tube.

13. The linear actuator according to claim 1, further comprising an end interface exterior to the casing and releasably connected to a distal end of the sliding tube.

14. The linear actuator according to claim 1, further comprising a vent hole in the casing and in fluid communication with the inner cavity.

15. The linear actuator according to claim 1, further comprising a connection flange secured to a distal end of the casing, the connection flange adapted to be connected to a seat structure.

16. The linear actuator according to claim 1, further comprising at least one bore in a body of the casing configured for receiving a fastener to connect the casing to the structure.

17. The linear actuator according to claim 16, wherein an axis of the at least one bore is transversely oriented relative to a direction of translation of the sliding tube.

18. A linear actuator comprising:
a motor having an output shaft for producing a bi-directional rotational output;
a casing having an inner cavity defining a joint surface;
a threaded shaft within the inner cavity of the casing;
an end block connected to a proximal portion of the casing and to the motor, the end block having a tubular portion and defining an abutment seat surface;
at least one bearing within the inner cavity and seated and retained against the abutment seat surface in the end block;
a coupling assembly for coupling the output shaft of the motor to the threaded shaft for transmission of the rotational output to the threaded shaft, the coupling assembly having at least a first coupling component receiving the rotational output from the motor, and at least a second coupling component coupled to the first coupling component, and wherein the second coupling component comprises a tubular shaft support received in an inner race of the bearing, the tubular shaft support receiving therein a proximal end of the threaded shaft, the tubular shaft support having a pair of fingers projecting proximally for being coupled to the first coupling component;
a sliding tube in sliding arrangement with the inner cavity of the casing for moving in translation relative to the casing;
a traveling nut connected to the sliding tube for moving therewith, the traveling nut being operatively engaged to the threaded shaft for converting a rotational motion of the threaded shaft into a translation of the sliding tube; and
an integral assembly unit comprising the motor, the threaded shaft, the end block, the at least one bearing, the traveling nut and the sliding tube interconnected to one another so as to be separable by pulling out the integral assembly as a whole from the inner cavity of the casing via the proximal end.

19. The linear actuator according to claim 18, wherein the first coupling component comprises a pair of fingers being coupled to the pair of fingers of the tubular shaft support.

20. The linear actuator according to claim 19, further comprising a cross-shaped interface between the pair of fingers of the first coupling component and of the second coupling component.

21. The linear actuator according to claim 18, wherein the tubular portion of the end block is in contact against a surface of the inner cavity of the casing in an axial section including the bearing.

22. The linear actuator according to claim 18, wherein the abutment seat surface is defined by a counterbore adjacent to a distal end of the end block, and further comprising a ring fastened to the distal end of the end block, whereby the bearing is retained between the abutment seat surface and the ring in the integral assembly unit.

23. The linear actuator according to claim 18, wherein the end block has a flange connected to an exterior of the proximal end of the casing and to the motor, the tubular portion projecting distally from the flange.

24. The linear actuator according to claim 18, wherein the casing is machined solely by removal of material from a monolithic substantially cylindrical tube.

25. The linear actuator according to claim 24, further comprising a receptacle machined in a cylindrical surface of the casing, at least one guide received in the receptacle and projecting inwardly from the joint surface, and at least one guide channel in the sliding tube, the at least one guide being received in the at least one guide channel to prevent rotation of the sliding tube relative to the joint surface.

26. The linear actuator according to claim 25, wherein the at least one guide channel is sized so as to delimit a stroke of the sliding tube relative to the casing by contact with the at least one guide.

27. The linear actuator according to claim 18, further comprising at least one low-friction sleeve against the joint surface in the inner cavity, the sliding tube sliding against the at least one low-friction sleeve when moving in translation.

28. The linear actuator according to claim 18, further comprising an end interface exterior to the casing and releasably connected to a distal end of the sliding tube.

29. The linear actuator according to claim 18, further comprising a connection flange secured to a distal end of the casing, the connection flange adapted to be connected to a seat structure.

30. A linear actuator comprising:
  a motor having an output shaft for producing a bi-directional rotational output;
  a casing having an inner cavity defining a joint surface;
  a threaded shaft within the inner cavity of the casing;
  an end block connected to a proximal portion of the casing and to the motor, the end block having a tubular portion and defining an abutment seat surface;
  at least one bearing within the inner cavity and seated and retained against the abutment seat surface in the end block;
  a coupling assembly for coupling the output shaft of the motor to the threaded shaft for transmission of the rotational output to the threaded shaft;
  a sliding tube in sliding arrangement with the inner cavity of the casing for moving in translation relative to the casing;
  a traveling nut connected to the sliding tube for moving therewith, the traveling nut being operatively engaged to the threaded shaft for converting a rotational motion of the threaded shaft into a translation of the sliding tube; and
  an integral assembly unit comprising the motor, the threaded shaft, the end block, the at least one bearing, the traveling nut and the sliding tube interconnected to one another so as to be separable by pulling out the integral assembly as a whole from the inner cavity of the casing via the proximal end;
  wherein the tubular portion of the end block is in contact against a surface of the inner cavity of the casing in an axial section including the bearing.

31. The linear actuator according to claim 30, wherein the abutment seat surface is defined by a counterbore adjacent to a distal end of the end block, and further comprising a ring fastened to the distal end of the end block, whereby the bearing is retained between the abutment seat surface and the ring in the integral assembly unit.

32. The linear actuator according to claim 30, wherein the end block has a flange connected to an exterior of the proximal end of the casing and to the motor, the tubular portion projecting distally from the flange.

33. The linear actuator according to claim 30, wherein the casing is machined solely by removal of material from a monolithic substantially cylindrical tube.

34. The linear actuator according to claim 33, further comprising a receptacle machined in a cylindrical surface of the casing, at least one guide received in the receptacle and projecting inwardly from the joint surface, and at least one guide channel in the sliding tube, the at least one guide being received in the at least one guide channel to prevent rotation of the sliding tube relative to the joint surface.

35. The linear actuator according to claim 34, wherein the at least one guide channel is sized so as to delimit a stroke of the sliding tube relative to the casing by contact with the at least one guide.

36. The linear actuator according to claim 30, further comprising at least one low-friction sleeve against the joint surface in the inner cavity, the sliding tube sliding against the at least one low-friction sleeve when moving in translation.

37. The linear actuator according to claim 30, further comprising an end interface exterior to the casing and releasably connected to a distal end of the sliding tube.

38. The linear actuator according to claim 30, further comprising a connection flange secured to a distal end of the casing, the connection flange adapted to be connected to a seat structure.

39. A linear actuator comprising:
  a motor having an output shaft for producing a bi-directional rotational output;
  a casing having an inner cavity defining a joint surface;
  a threaded shaft within the inner cavity of the casing;
  an end block connected to a proximal portion of the casing and to the motor, the end block having a tubular portion and defining an abutment seat surface;
  at least one bearing within the inner cavity and seated and retained against the abutment seat surface in the end block;
  a coupling assembly for coupling the output shaft of the motor to the threaded shaft for transmission of the rotational output to the threaded shaft;
  a sliding tube in sliding arrangement with the inner cavity of the casing for moving in translation relative to the casing;
  a traveling nut connected to the sliding tube for moving therewith, the traveling nut being operatively engaged to the threaded shaft for converting a rotational motion of the threaded shaft into a translation of the sliding tube; and
  an integral assembly unit comprising the motor, the threaded shaft, the end block, the at least one bearing, the traveling nut and the sliding tube interconnected to one another so as to be separable by pulling out the integral assembly as a whole from the inner cavity of the casing via the proximal end;
  wherein the abutment seat surface is defined by a counterbore adjacent to a distal end of the end block, and further comprising a ring fastened to the distal end of the end block, whereby the bearing is retained between the abutment seat surface and the ring in the integral assembly unit.

40. The linear actuator according to claim 39, wherein the end block has a flange connected to an exterior of the proximal end of the casing and to the motor, the tubular portion projecting distally from the flange.

41. The linear actuator according to claim 39, wherein the casing is machined solely by removal of material from a monolithic substantially cylindrical tube.

42. The linear actuator according to claim 41, further comprising a receptacle machined in a cylindrical surface of the casing, at least one guide received in the receptacle and projecting inwardly from the joint surface, and at least one guide channel in the sliding tube, the at least one guide being received in the at least one guide channel to prevent rotation of the sliding tube relative to the joint surface.

43. The linear actuator according to claim 42, wherein the at least one guide channel is sized so as to delimit a stroke of the sliding tube relative to the casing by contact with the at least one guide.

44. The linear actuator according to claim 39, further comprising at least one low-friction sleeve against the joint surface in the inner cavity, the sliding tube sliding against the at least one low-friction sleeve when moving in translation.

45. The linear actuator according to claim 39, further comprising an end interface exterior to the casing and releasably connected to a distal end of the sliding tube.

46. The linear actuator according to claim 39, further comprising a connection flange secured to a distal end of the casing, the connection flange adapted to be connected to a seat structure.

* * * * *